Jan. 4, 1927.
C. H. LOUTREL
1,613,232
SPRING WASHER
Filed June 7, 1926
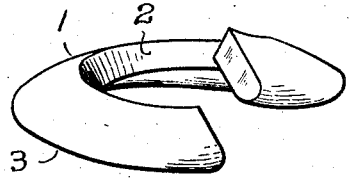
Fig.1.
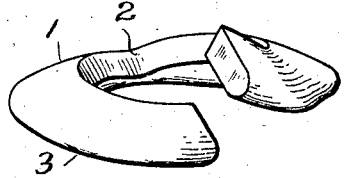
Fig.5.
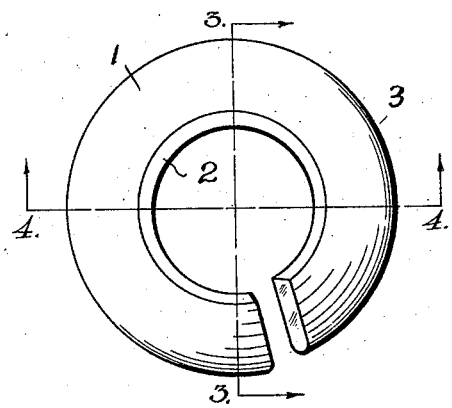
Fig.2.
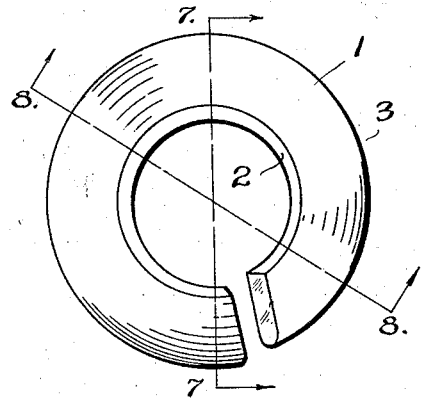
Fig.6.
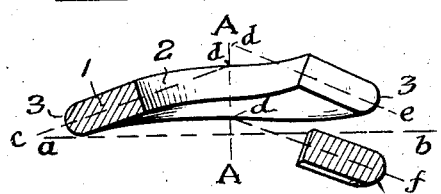
Fig.3.
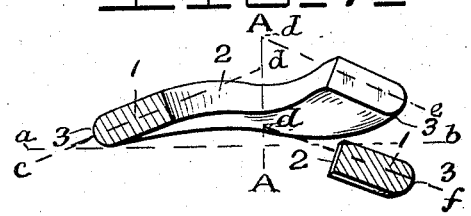
Fig.7.
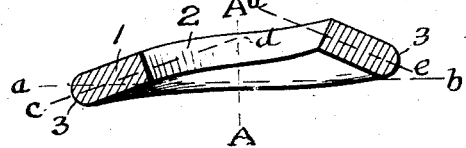
Fig.4.
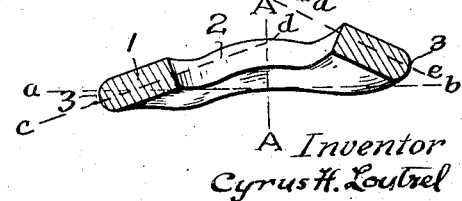
Fig.8.
Inventor
Cyrus H. Loutrel
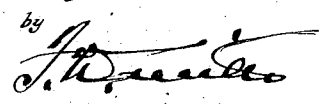
by
Attorney Patented Jan. 4, 1927.

1,613,232

UNITED STATES PATENT OFFICE.

CYRUS H. LOUTREL, OF SOUTH ORANGE, NEW JERSEY, ASSIGNOR TO THE NATIONAL LOCK WASHER COMPANY, OF NEWARK, NEW JERSEY, A CORPORATION OF NEW JERSEY.

SPRING WASHER.

Application filed June 7, 1926. Serial No. 114,252.

This invention relates to improvements in spring washers of the split ring type, and it consists in certain constructions and combinations of parts hereinafter fully described and then particularly pointed out in the claims which conclude this specification.

In spring washers of the helical segment type as heretofore constructed, whether they were of the plain helical segment type or of the corrugated or deformed type, the material transversely has either been in planes substantially at right angles to the axis of the segment, or in planes which when projected inwardly substantially meet at a common apex located on said axis.

In the manufacture of washers of the above description a certain character of steel has heretofore been used, and an approved style of washer has so distributed the strains of compression that there is no danger of the washer breaking under these strains, but the present invention contemplates a construction of the washer whereby the latter will be subjected to much more severe strains, and in order to withstand these strains without breaking, the washer made in accordance with the present invention has been formed from a very superior and tough grade of steel and the washer thus formed is capable of withstanding much severer strains of compression and at the same time possesses all the good attributes of the best style of washer heretofore made.

The present washer is so fashioned that the inner or shorter circumference will, in the act of being compressed between parallel surfaces, be deflected a greater distance than the outer or longer circumference. That is to say, the inner circumference of the washer departs from the ultimate plane of compression a distance greater than the outer circumference, and also the pitch of those spiral lines contained in the inner circumference is greater than the pitch of those spiral lines contained in the outer circumference.

It will thus be manifest that this washer will be stiffer and will offer greater resistance to the strains of compression than the washers in which the inner circumference departs from the ultimate plane of compression a distance less than does the outer circumference.

In this construction of washer just described, the upper face has a general conical shape, and all the width surfaces of such face when projected inwardly intersect the axis of the washer at points which vary in direct proportion to the progression of the radius that originally formed the helix from which the washer segment was cut.

While the strains set up in this washer, when under compression between parallel surfaces, are much more severe than in the instance of other washers, and while the present washer, if made from the material heretofore used, would undoubtedly break owing to these strains of compression, nevertheless these strains are equally distributed and the metal itself of the washer is of such a nature that compression will work no damage.

Referring to the drawings—

Figure 1 is an elevation in perspective of a plain split ring type of washer, formed from a helical segment, constructed in accordance with the present invention.

Figure 2 is a plan view of the same.

Figure 3 is a section on the line 3—3 of Figure 2.

Figure 4 is a section on the line 4—4 of Figure 2.

Figure 5 is an elevation in perspective of a spring washer similar to that shown in Figure 1, but with the material formed in a series of corrugations or deformations.

Figure 6 is a plan view of the structure shown in Figure 5.

Figure 7 is a section on the line 7—7 of Figure 6, and

Figure 8 is a section on the line 8—8 of Figure 6.

In each of the figures, 1 generally denotes a spring washer of the split ring type, 2 is the inner circumference, 3 the outer circumference, $a$—$b$ is the ultimate plane of compression, A—A is the axis of the spring washer, $c$—$d$ and $e$—$d$ and $f$—$d$ are planes of the material of the spring washer taken at different points, and it will be observed that these planes all intersect the axis A—A at different points.

The essential feature of the present style of washer is that the inner circumference of the washer, as is clearly shown in the drawing, in being deflected to or toward the ultimate plane of compression, moves a greater distance than does the outer circumference.

What is claimed is:—

1. A spring washer of the split ring type which consists of a helical segment the inner circumference of which departs from the ultimate plane of compression a distance greater than does the outer circumference.

2. A spring washer of the split ring type formed from a helical segment the upper surfaces of which are inclined from the outer perimeter upwardly to the inner perimeter, which surfaces when projected inwardly intersect the axis of the washer at points which vary in direct proportion to the progression of the radius of the helix.

3. A spring washer of the split ring type formed of a helical segment, the material thereof transversely being so formed that the pitch of those spiral lines contained in the inner circumference is greater than the pitch of those spiral lines contained in the outer circumference.

In testimony whereof I affix my signature hereto.

CYRUS H. LOUTREL.